J. Broughton.
Oiler

No. 2,686. Reissued Jul. 16, 1867.

Witnesses:
N. Van Santvoord
Gustave Dieterich.

Inventor:
John Broughto

UNITED STATES PATENT OFFICE.

JOHN BROUGHTON, OF NEW YORK, N. Y.

IMPROVEMENT IN OILERS.

Specification forming part of Letters Patent No. 52,959, dated March 6, 1866; Reissue No. 2,686, dated July 16, 1867.

*To all whom it may concern:*

Be it known that I, JOHN BROUGHTON, of the city, county, and State of New York, have invented a new and useful Improvement in Oilers; and I do hereby declare that the following is a full, clear, and exact description thereof, which will enable those skilled in the art to make and use the same, reference being had to the accompanying drawings, forming part of this specification, in which—

Figure 1:
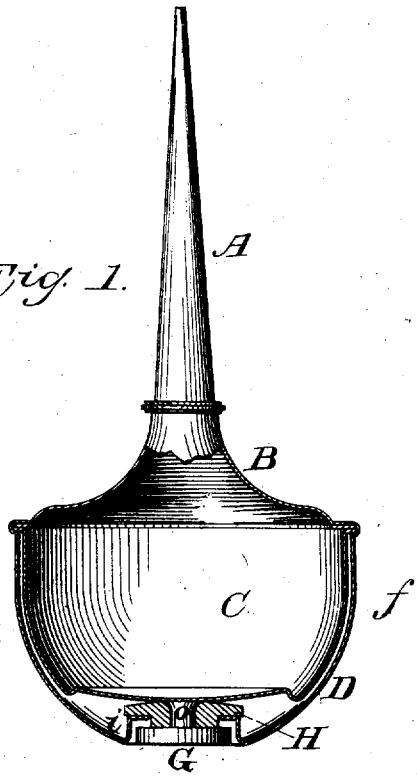
Figure 2:
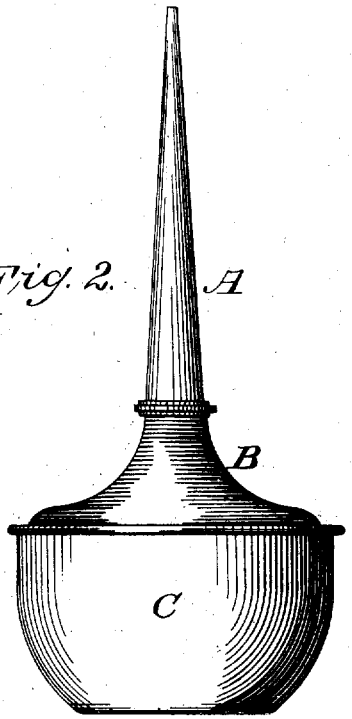
Figure 3:
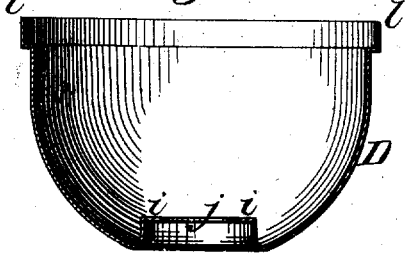

Figure 1 is an elevation, partly in section, of an oiler made according to my invention. Fig. 2 is an elevation of an oiler having a yielding or spring bottom extending upward high enough to form a reservoir for oil, detached from its rigid exterior; and Fig. 3 is a section of the rigid exterior, shown detached.

Similar letters of reference indicate corresponding parts.

The objects of this improvement are as follows:

First. To so construct a spring-bottom oiler that no soldered joint is required to connect such spring-bottom with the sides of the reservoir, thus rendering it less liable to become leaky by the action of the bottom, or by being placed in a hot position than spring-bottom oilers of the ordinary construction. This is accomplished by forming the spring-bottom and the sides of the reservoir of one piece, and joining the same to a rigid cover, the joint being in an elevated position, where it cannot be melted when the oiler is placed upon a hot stove.

Second. To form a rigid or inflexible external surface to the entire oiler, except at the point where the thumb is placed when operating it, so that the spring-bottom is protected from injury by bruising or from accidental punctures. This is is accomplished by inclosing the reservoir below the cover-joint in a strong shell or casing, which forms a rigid exterior, and providing the latter with an opening, through which the yielding or spring bottom may be reached and operated.

Third. To provide a method of operating the yielding or spring bottom of an oiler, so that it cannot be forced inward beyond the limits of its elasticity, thus insuring the retention of its spring or elasticity as long as the oiler lasts. This is accomplished by forming an internal flange in the opening through the rigid exterior D, and providing an operating thumb-piece G H with two heads, an internal and an external one, the two being connected by a center-pin or rivet. The internal head rests upon the flange of the opening in the rigid exterior, which prevents it from dropping out. The external head spans the flange around the said opening in a similar manner, an annular space being formed between the two heads. This annular space corresponds in depth to the movement to be given to the inner spring-bottom, and when the thumb is pressed on the external head, G, the spring-bottom is compressed and moved inward until said head rests upon the flange of the rigid exterior, thus forming a stop within the limit of the elasticity of the yielding or spring bottom, and beyond which it cannot be forced.

Fourth. To arrange and construct a spring-bottom oiler in such a manner that while the yielding or spring bottom is compressed and operated by the thumb in the ordinary manner, its lower external rigid portion shall form a rolling surface. This is accomplished by making the rigid outer surface approximate to the form of a semi-sphere, and combining therewith an auxiliary yielding or spring bottom, which can be reached and operated through the perforation.

Fifth. An additional object is to arrange and construct a spring-bottom oiler in such a manner that while its spring-bottom is compressed and operated by the thumb in the ordinary manner, and its lower external rigid portion forms a rolling surface, its center of gravity is near the lower part of the oiler, so that it will not upset. This is accomplished by raising the yielding or spring bottom a little distance above the lowest part of the rigid exterior, so as to make the lower portion of the reservoir in the form of a zone, thereby leaving a recess between the yielding and rigid parts, in which I place the operating thumb-piece, which necessarily, being of a diameter large enough to place the thumb upon, forms a counterpoise to the upper portion of the oiler and its tube without any special provision for that purpose.

One of the principal and characteristic features in a self-balancing oiler is that the exterior or lower part thereof must approximate in form to a semi-sphere in order to form a rolling surface. Among the self-balancing oilers heretofore made one kind has the entire external surface rigid or inflexible, such rigidity or inflexibility constituting its principal defect, since the oil cannot be expelled by pressure against the side or bottom, but can only drop or flow out when it is inverted and shaken. Another kind has a semi-spherical bottom without seam or opening, and a flexible top, by compressing which the oil is expelled. The position and operation of this flexible top are its principal defects, it being extremely liable to become damaged by bruising and puncturing, and is easily and quickly overstrained in the act of compressing it to expel the oil. In order, therefore, to construct an improved self-balanced oiler in which these defects shall be obviated, some part or portion must be made yielding or elastic, and yet such elasticity must not be in the top. Consequently, I make the top of the oiler rigid, and since its lower part must be rounded or be made to approximate to the form of a semi-sphere in order to become self-balancing, and since, when metals are spun or stamped into that shape they become stiff and unyielding, it follows that the desired elasticity cannot be obtained except by perforating or forming an opening in it and inserting an auxiliary yielding bottom in such a position that it can be reached and compressed and operated through the said opening. Such auxiliary yielding part should be placed directly above or over the perforation, or in proximity to it, so that it can be easily operated with the thumb and yet not interfere with the automatic or self-righting movement of the oiler. Such auxiliary yielding bottom may be secured in any suitable way, and in order to avoid a soldered joint within the oiler near its lower part, where it would be more or less inaccessible, and which might become leaky, if the oiler is set on a stove or other hot surface, it is advantageous to carry up the edges or sides of the yielding part high enough to be safe from injury from such a cause. In this example of my invention I have continued the sides of the yielding part up to the full height of the body of the oiler, thereby avoiding a soldered joint at or near the lower part of the oiler, and preventing liability to leakage therefrom. The advantages of this arrangement and construction are that the oiler will not leak, nor is it liable to become leaky by use, its external surface being rigid except at the point where the thumb is placed. It presents neither flexible nor yielding top or bottom to become injured from liability to be punctured or bruised; it will always stand in a vertical position, or, if upset, will right itself and return to such position; its yielding bottom cannot be injured or strained by compression; consequently it will always retain its spring, and is always in condition to eject the oil; it is very durable, bruising or battering by dropping or rough usage not affecting its operation.

The letter A designates the tube or nozzle of the oiler. C is its body or reservoir, and B its cover or top. The latter is rigid in this example, and is connected to the tube or nozzle by a screw-joint. The parts A B C are seen together in Fig. 2, which represents an oiler complete and ready for use without the protection of the shell D, which in this example forms its outer rigid and rolling surface. When the bottom K is made to spring upward, oil will be forced out through the end of nozzle A. The rigid exterior surface, D, is made to approximate in form to a semi-sphere, a circular cavity being formed immediately at its lower part, at the top of which cavity is an opening or perforation, *j*, made centrally therein, and this opening is surrounded by a horizontal flange, *i*. The internal head, H, of the button G H is placed within the rigid exterior, D, so as to rest on and be sustained by the flange *i*, its center part, which is perforated, projecting down past the flange and fitting loosely within it. The thickness of the head H is such that it will be about equal to the distance between the flange *i* and the lowest part of the yielding bottom K when the said yielding bottom is placed within the rigid exterior D. The external head, G, has a pin, O, projecting centrally from its upper surface, and which is pushed up through the head H and riveted. The diameter of the head G is greater than that part of the head H which projects through the perforation, and its edge consequently extends beyond in a line parallel with and below the flange *i*, the length of the center part or body of the head H where it projects through the perforation determining the distance between the head G and the under side of the flange. It is not intended that the head G shall touch the supporting surface on which the oiler stands, the thickness or length of said head being such that when it is riveted to the head H it will not reach such supporting-surface.

The letter U designates the space left between the flange *i* and the upper face of the head G when the oiler is in a state of rest; and, since the head G cannot pass the flange when the head is pushed upward, it follows that when the button, composed of the heads G H, is pushed upward by the person using the oiler it can only move through the space or distance U, and therefore the yielding surface cannot be sprung or moved upward a greater distance.

In carrying out that part of my invention which consists in extending the flange or edge of the elastic bottom upward, and so forming both the sides and elastic bottom of one piece of metal, I had to secure a considerable degree of hardness in one part and considerable softness in another part—that is to say, the part forming the bottom is required to be hard and elastic, in order to spring, while the part intended for the sides requires, on the contrary, to be soft to allow it to be spun. As the same sheet of metal does not possess these two opposite qualities, and a long series of experiments by the methods ordinarily used in stamping, spinning, and partial annealing failed to produce the required shape from sheet brass possessing the requisite hardness for the spring-bottom, I invented the following process: Sheets of soft brass are first cut up into blanks of the proper diameter. These blanks are then secured or clamped to the flat face of a chuck placed on the mandrel of a lathe capable of revolving at a high velocity. The clamp which confines the blank to the face of the chuck is in the form of an annular ring, the inner diameter exceeding somewhat the diameter of the oiler-bottom. A compressing spinning-tool is then pressed against the outer face of the revolving blank at its center, and is moved outward under a slightly-decreasing pressure until the tool comes in contact with the inner circumference of the clamping-ring, when its motion is arrested. This operation has the effect of compressing and hardening the central portion of the blank to a diameter corresponding to that of the spring-bottom required. It also stretches the metal somewhat, and the blank, when taken off, appears in section thus, 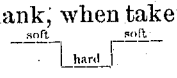

It is then placed in the die of a drop-press, and the bottom part, K, Fig. 1, is stamped to the required shape. In this form it is clamped against the end of a revolving chuck, and the soft sides spun up to the required height. The edge of the metal, whether spun up or not, is united to the rigid shell by any suitable means.

I claim as new and desire to secure by Letters Patent—

1. An oiler having a rigid exterior inclosing or containing an auxiliary yielding or spring bottom, which is compressed or operated through a suitable opening in the said rigid exterior, substantially as set forth.

2. Combining with the yielding or spring bottom of an oiler, a rigid or inflexible exterior, whose lower part is rounded or made to approximate in shape to a semi-sphere, to form a rolling-surface, and is provided with an opening, through which the yielding or spring bottom can be operated, substantially as set forth.

3. The combination, in an oiler, of a rigid exterior, an internal yielding or spring bottom, and a compressing thumb-piece, substantially as set forth.

4. Combining with the yielding or spring bottom of an oiler a stop applied in such a manner that such yielding part cannot be compressed beyond the limits of its elasticity when said stop is applied and operated externally thereto, substantially as set forth.

5. In oilers provided with yielding or spring bottoms, forming the sides of the reservoir and such yielding or spring bottom of one piece, substantially as set forth.

6. Combining with the tube or nozzle and cover of an oiler a reservoir the sides and yielding or spring bottom of which are formed of one piece, without joint or seam, substantially as set forth.

7. Combining with the reservoir of an oiler the yielding or spring bottom and the sides of which are formed of one piece, a rigid exterior or shell provided with a suitable opening through which the yielding part can be compressed and operated, substantially as set forth.

JOHN BROUGHTON.

Witnesses:
J. VAN SANTVOORD,
GEO. F. SOUTHERN.